April 21, 1970 R. J. DIJKSTRA ET AL 3,508,135
DEVICE COMPRISING A PLURALITY OF SERIES-ARRANGED, SEMICONDUCTOR CONTROLLED RECTIFIERS
Filed Nov. 21, 1967
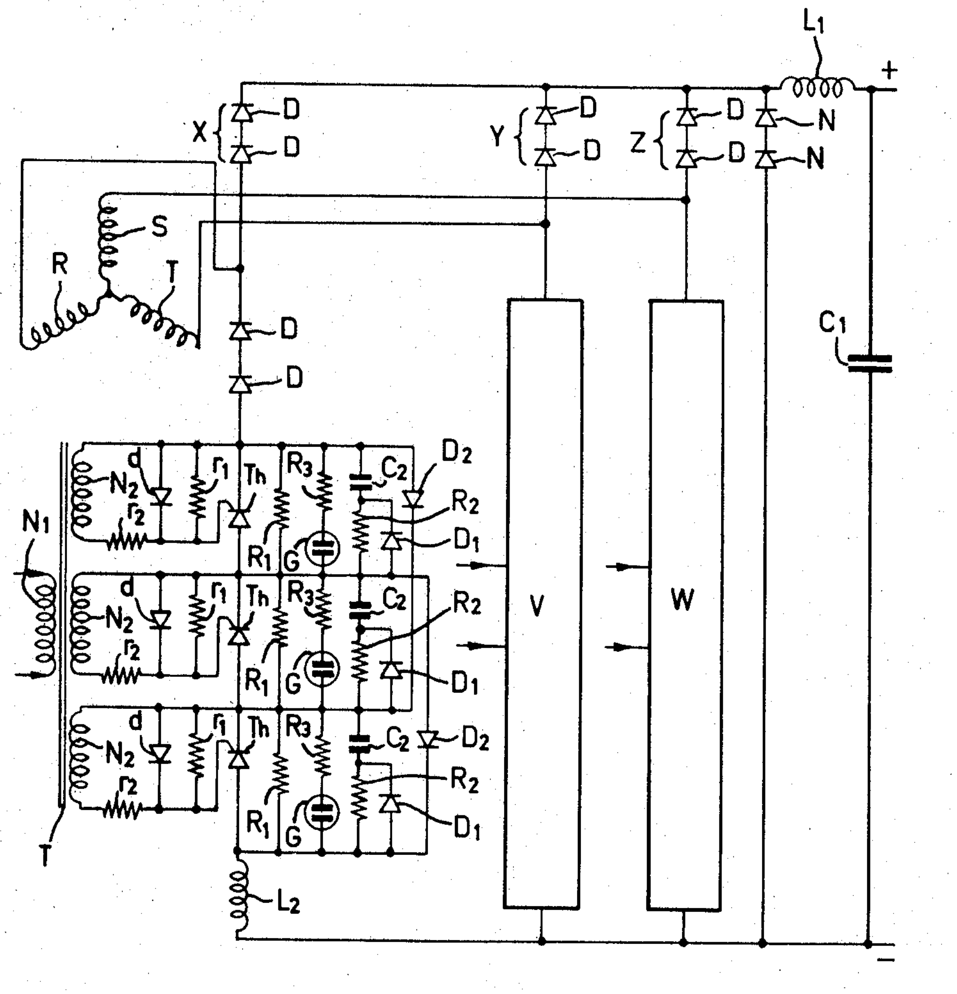
RIENTS J. DIJKSTRA
LEENDERT J. HOFLAND
JACOBUS F. van DAM
INVENTORS
BY
Frank R. Trifari
AGENT United States Patent Office 3,508,135

Patented Apr. 21, 1970

3,508,135

DEVICE COMPRISING A PLURALITY OF SERIES-ARRANGED, SEMICONDUCTOR CONTROLLED RECTIFIERS

Rients Jan Dijkstra, Hilversum, Netherlands, Leendert Johannes Hofland, Hermuhlheim, Cologne, Germany, and Jacobus Franciscus van Dam, Stadskanaal, Netherlands, assignors, by mesne assignments, to U.S. Philips Corporation, New York, N.Y., a corporation of Delaware Filed Nov. 21, 1967, Ser. No. 684,818

Int. Cl. H02m *1/18;* H03k *17/00;* G08b *21/00*

U.S. Cl. 321—11 10 Claims

ABSTRACT OF THE DISCLOSURE

A high voltage rectifier comprising a plurality of semiconductor controlled rectifiers connected in series between an AC voltage source and a load. A plurality of avalanche diodes is individually connected in parallel with individual pairs of the controlled rectifiers. The avalanche breakdown voltage of the diodes is less than twice the minimum forward anode-cathode breakdown voltage of a controlled rectifier and is greater than the maximum forward anode-cathode breakdown voltage of a single controlled rectifier. One or more rectifiers are connected in series with the controlled rectifiers and with the same polarity.

This invention relates to a device comprising a plurality of series-arranged semiconductor controlled rectifiers.

Such devices are used, for example, in controllable high-voltage rectifiers, high-voltage converters, high-voltage control circuits, when the forward breakdown voltage and/or the reverse blocking voltage of a single available semiconductor controlled rectifier is too low to handle the available AC or DC voltage and/or to generate the desired DC or AC voltage. A very important application is in a high-voltage rectifier installation for energizing high power transmitting tubes, for example, the output stage of a broadcast transmitter having a high-frequency power of 50 kilowatts or more and a DC voltage of, for example, 11 kilovolts.

In such an installation a rapid and correct safe-guarding of the expensive transmitting tubes is very important. This is obtained by switching off the high voltage in case of a disturbance occurring in the high-frequency output circuit and/or in the output tubes. Since program interruptions of the transmitter should be brief, the switching off of the short-circuit power of the output stage is preferably realized without the aid of mechanical circuit breakers, since mechanical circuit breakers are comparatively inert. It this respect, semiconductor controlled rectifiers offer many and great advantages relative to other controlled rectifiers such as thyratrons or ignitrons. For Example, they are much lighter and smaller of dimensions, their lifetime is much longer, their operation is much less temperature-dependent, they need not be preheated and do not cause disturbances by flash-backs such as may occur in thyratrons.

There is, however, the drawback that the presently available semiconductor controlled rectifiers have a maximum peak blocking voltage of approximately 1000 volts so that a relatively large number of series-arranged rectifiers must be used. Here the difficulty presents itself that in a device comprising a plurality of series-arranged controlled rectifiers, an unwanted ignition of one of the rectifiers as a result of an unequal voltage distribution among the rectifiers, be it even temporary, for example, as a result of a short transient voltage peak, occurs more easily according as the number of controlled rectifiers is larger. On the other hand, it has been necessary up till now to use a number of additional rectifiers in order to prevent an unwanted ignition of one of the rectifiers from producing the breakdown of the entire device.

An object of the invention is to obviate said difficulty and to provide a device of the type defined in which unwanted ignitions as a result of too high a voltage peak across the entire device and/or of an unequal voltage distribution are prevented.

According to the invention, the device is characterized in that the main-current circuit of each group of at least two controlled rectifiers of said plurality is shunted by a diode connected in the reverse direction and having a controlled avalanche breakdown voltage lower than the minimum forward anode-cathode breakdown voltage of one the controlled rectifiers, multiplied by the number of controlled rectifiers of the group, and higher than the maximum forward anode-cathode breakdown voltage of one of said controlled rectifiers. As a result of this construction, unwanted ignition of the controlled rectifiers of the group caused by a voltage peak is prevented. Also, with controlled ignition of the controlled rectifiers and failure of one of the controlled rectifiers of a group said controlled rectifier is ignited by breakdown by the voltage occurring between its anode and cathode. In addition, a rectifier having a reverse breakdown voltage at least equal to that of the series arrangement of all controlled rectifiers is connected in series therewith and in the same pass direction, so that the device has the required reverse blocking voltage in spite of the connection of a diode passing current in the blocking direction of the device and connected in parallel with at least a group of controlled rectifiers thereof.

The plurality of semiconductor controlled rectifiers is preferably divided in a plurality of groups of two rectifiers, whereby, in case of an odd number of controlled rectifiers, one rectifier can belong to two successive groups.

In order that the invention may be readily carried into effect, it will now be described in detail, by way of example, with reference to the accompanying diagrammatic drawing, which shows one embodiment of the device according to the invention.

The embodiment shown forms a rectifier branch U of a high-voltage supply installation including a three-phase full-wave rectifier. Three branches U, V and W thereof lie between a DC-voltage terminal and the phases are controlled. Two controlled branches V and W are shown in block form only, while the uncontrolled branches X, Y and Z are formed by a series arrangement of high voltage semiconductor rectifier diodes D. The installation is energized by the secondary windings R, S and T of a three-phase transformer. It further includes a smoothing choke $L_1$, a smoothing capacitor $C_1$ and a free-wheel rectifier consisting of the series arrangement of a plurality of semiconductor rectifier diodes N.

The device U comprises three series-arranged semiconductor controlled rectifiers T*h* of the type exhibiting controlled avalanche breakdown in the forward direction.

Each of said controlled rectifiers T*h* can be rendered periodically conductive by a positive voltage pulse applied between its control electrode and its cathode during the period of time that its anode is positive relative to its cathode. The pulses are simultaneously applied to all controlled rectifiers of the device through a control transformer T having a primary winding $N_1$ and a plurality of secondard windings $N_2$ equal to the number of controlled rectifiers. In a device having more than 5 or 6 series-arranged controlled rectifiers, the rectifiers are divided into control groups of, for example, three or four rectifiers each. The rectifiers are controlled via two cascade-arranged transformers comprising a main control transformer having a primary winding and a plurality of secondary windings equal to the number of control groups and, for each control group, a second transformer having a primary winding connected to a corresponding secondary winding of the main control transformer and having a plurality of secondary windings equal to the number of controlled rectifiers of the corresponding control group. In said manner the wiring of each control circuit is kept as short as possible, which strongly reduces the possibility of igniting a controlled rectifier by a perturbation pulse and makes it easier to solve the insulation problem.

The control circuit of each controlled rectifier T*h* is shunted by a first resistor $r_1$ which makes the rectifier more insensitive to high-frequency interference voltages. A diode *d* also shunts the control circuit and limits the negative voltages applied between the control electrode and the cathode to a low value. Each control circuit is connected to a corresponding secondary winding $N_2$ through a second resistor $r_2$ which limits the power supplied to said control circuit, and the energy dissipation in said circuit and in the control electrode of the rectifier.

An even distribution of the DC voltage between the controlled rectifiers in the forward blocking condition is realized by means of a voltage divider consisting of the series arrangement of a plurality of resistors $R_1$. Each of these resistors is connected parallel to the main current circuit of one of the controlled rectifiers T*h*. The resistance value thereof is approximately five times lower than that of the minimum forward blocking resistance of the controlled rectifier. The static voltage distribution is improved dynamically by a filter $C_2$, $R_2$, $D_1$ connected parallel to the main current circuit of each controlled rectifier. In case of high short circuit currents, for example, higher than or equal to ten times the maximum current, and having steep edges, large voltage steps occur in high-voltage circuits in which stray inductances and other impedances are present. Said high-frequency voltages are kept within permissible limits across each controlled rectifier by the corresponding capacitor $C_2$ which limits steep voltage variations $dv/dt$ across the rectifier to a permissible value. The series resistor $R_2$ is thereby necessary in order to limit the steepness $dI/dt$ of the increase of the current through the controlled rectifier when the capacitor $C_2$ is discharging, for example, when the controlled rectifier T*h* is ignited. The steepness in combination with the rate of increase $dI/dt$ of the current through the device upon the same becoming conductive having to be limited to a value permissible for the controlled rectifier. On the other hand, it must be possible to charge the capacitor $C_2$ rapidly in the forward blocked condition of the controlled rectifier, and this is effected by means of the diode $D_1$ which short-circuits the resistor $R_2$ in the forward direction.

A series choke $L_2$ limits the rate of increase $dI/dt$ of the current through the device, when said device is rendered conductive, to a value permissible for each rectifier T*h*. Too high a rate of increase of the current is one of the most important factors which may lead to the destruction of a controlled rectifier. When increasing the voltage the current increases in accordance with a frequency which is principally determined by the parasitic impedances present in the circuit. The choke $L_2$ decreases said frequency and attenuates the build-up phenomenon to such a value that the magnitude of $dI/dt$ at the time of switching on, in combination with the $dI/dt$ from the network $R_2C_2$, is below the maximum value permissible for the controlled rectifiers. In case of a sufficiently high value of $L_2$, one choke for each device or controlled branch of the rectifier installation is sufficient, although the switching-on phenomena are not identical in all controlled rectifiers.

The choke may become saturated after the current has grown to approximately 30% of its final value.

In spite of the described use of static and dynamic voltage-dividers ($R_1$ and $C_2R_2D_1$ respectively) and the precautions taken in the control circuits, conduction still occurs, especially in devices including a large number of series-arranged controlled rectifiers, in a controlled rectifier at an unwanted instant which is caused by forward breakdown produced by short unequal voltage distribution among the controlled rectifiers. For example, in the case of a short circuit in the load circuit just when the device should switch off the short-circuit current. Said possibility of perturbation limits one of the most important advantages of the use of controlled rectifiers (rapid and correct protection of the circuit supplied against short circuit) and may be obviated by using a plurality of additional controlled rectifiers in the series circuit.

In order to prevent the entire device from becoming conductive as a result of a voltage peak applied thereto, which would render all controlled rectifiers conductive by avalanche breakdown, the main circuit of each group of at least two controlled rectifiers T*h* of the device is shunted, according to the invention, by a diode $D_2$ connected in the reverse direction. This diode exhibits a controlled avalanche breakdown characteristic and has a reverse breakdown voltage $V_{piv}$ lower than the minimum forward anode-cathode breakdown voltage $V_{FBO}$ of one of the controlled rectifiers multiplied by the number *n* of controlled rectifiers of the same group, and higher than the maximum forward anode-cathode breakdown voltage $V_{FBO}$ of one of said controlled rectifiers T*h*.

It stands to reason that the inequality $$n \cdot V_{FBO} \text{ min.} > V_{piv} > V_{FBO} \text{ max.}$$

must be fulfilled within the entire barrier layer temperature range and at the reverse current $I_{rev}$ of the diodes $D_2$, for example, 5 ma. at 25° C. As a result, the voltage across the group of controlled rectifiers also is limited to the value $V_{piv}$ as regards short-lasting voltage peaks resulting from switching or short-circuit phenomena, so that none of the controlled rectifiers of the group can be ignited by avalanche breakdown as a result of such peaks. If, in case of desired ignition, one of the controlled rectifiers of a group fails to conduct, then, on the other hand, a voltage is applied across said controlled rectifier through the other controlled rectifier or rectifiers of the group. This voltage increases towards the value $V_{piv}$, whereby the controlled rectifier concerned is rendered conductive by avalanche breakdown when the breakdown voltage $V_{FBO}$, which is lower than $V_{piv}$, is exceeded.

Of course, the greatest security is obtained for $n=2$, that is to say, when the plurality of controlled rectifiers of the device is divided into a plurality of groups of two controlled rectifiers.

When a voltage is applied in the reverse direction across the controlled rectifiers T*h* of the device, the reverse voltage across the series arrangement of said controlled rectifiers is negligibly low as a result of the presence of the diodes $D_2$. In order nevertheless to bring about a rectifying action, according to the invention, a rectifier having a reverse breakdown voltage at least equal to that of the series arrangement of all controlled rectifiers is connected in series therewith and in the same pass direction. As shown, said rectifier consists of the series arrangement of a plurality of semiconductor rectifier diodes D. The diodes D provides the device with the required reverse blocking voltage in spite of the parallel connection of the diodes $D_2$, conducting in the blocking direction to at least one group of controlled rectifiers T*h* thereof, and also offers the possibility of an unregulated rectification in the case of perturbation in the control device or in the control circuits.

The series arrangement of a signalling glow discharge lamp G and a resistor $R_3$ is connected parallel to the main current path of each of the controlled rectifiers T*h*. The glow discharge lamp G has an ignition voltage lower than the forward avalanche breakdown voltage $V_{FBO}$ of the controlled rectifier T*h* and the resistor limits the maximum current flowing through the lamp G to a value permissible for said lamp. As a result, it is a simple matter to check whether the device operates satisfactorily. If the controlled rectifiers do not become conductive because they do not receive ignition control pulses during a considerable part of the positive half periods of the supply voltage effective at their respective anodes, that is to say, a zero output voltage or relatively low DC output voltage of the installation, all glow discharge lamps G will ignite as a result of the voltage across the respective corresponding controlled rectifiers. On the other hand, if the output DC voltage of the installation is increased as a result of the controlled rectifiers T*h* becoming periodically conductive, none of the glow discharge lamps G will glow since the ignition voltage of said lamps is higher than the forward voltage already effective between anode and cathode of the rectifiers T*h* at the instant of periodic ignition of said controlled rectifiers.

In a practical embodiment of the installation described, for a nominal output DC voltage of 11 kilovolts and a maximum output current of 30 amperes, the following elements were used:

Controlled rectifiers T*h*: 22 pieces per controlled branch, divided in 3 control groups of 4+2 control groups of 5.

Philips' type BTX 38–800 R.
Series rectifiers D as well as branches X, Y and Z of the installation.
15 pieces per branch, Philips' type BYX 23–1000.
Diodes *d*17 pieces per controlled branch: Philips' type OA 202.
Diodes $D_1$ 17 pieces per controlled branch: Philips' type BYX 10.
Diodes $D_2$ 9 pieces per controlled branch: Philips' type BYX 25–1000 with selected $V_{FBO}$ between 1400 and 1600 volts:
Resistors $r_1=10\Omega$
Resistors $r_2=5\Omega$
Resistors $R_1=54K\Omega$
Resistors $R_2=1K\Omega$
Resistors $R_3=0.6M\Omega$
Capacitors $C_2=18000$ pf.
Glow discharge lamps G: Philips' type GL 14 D.
Choke $L_2=2.0$ mH with Q=5 at 40 kcs. and with a parasitic capacitance smaller than 10 pf.
Effective AC voltage between two random junctions of the transformer T: 8750 volts nominal.
Smoothing choke $L_1$: 0.6 h.–30 amperes.
Smoothing capacitor $C_1$: 100 uf.–15 kv.

Free-wheel rectifier N: 15 pieces in series, Philips' type BYX 23–1000.

What is claimed is:

1. A device comprising a plurality of series-arranged semiconductor controlled rectifiers, means shunting the main-current circuit of each group of at least two controlled rectifiers of said plurality by a diode connected in the reverse direction and having a controlled avalanche breakdown voltage lower than the minimum forward anode-cathode breakdown voltage of one of the controlled rectifiers, multiplied by the number of controlled rectifiers of the group concerned, and higher than the maximum forward anode-cathode breakdown voltage of one of said controlled rectifiers, whereby unwanted ignition of the controlled rectifiers of the group as a result of a voltage peak is prevented, whereas during controlled ignition of the controlled rectifiers, a failure of one of the controlled rectifiers of a group, said controlled rectifier is ignited by breakdown caused by the voltage occurring between its anode and cathode, and a rectifier having a reverse breakdown voltage at least equal to that of the series arrangement of all controlled rectifiers and connected in series therewith in the same pass direction, so that the device has the required reverse blocking voltage in spite of the connection of a diode passing current in the blocking direction of the device in parallel with at least a group of controlled rectifiers thereof.

2. A device as claimed in claim 1, characterized in that the plurality of controlled rectifiers is divided into a plurality of groups of two controlled rectifiers.

3. A device as claimed in claim 1, characterized in that the main-current circuit of each controlled rectifier is shunted by the series arrangement of a signalling glow discharge lamp and a resistor.

4. Electric apparatus for coupling a source of voltage to a load comprising, a plurality of semiconductor controlled rectifiers connected in series, a plurality of avalanche diodes having a given value of controlled avalanche breakdown voltage, means individually connecting said diodes in parallel with groups of *n* controlled rectifiers for each diode, said diodes and rectifiers being chosen so that: $n\cdot V_{FBO}$ min. $>V_{piv}>V_{FBO}$ max., wherein $V_{FBO}$ min. and $V_{FBO}$ max. are the minimum and maximum values, respectively, of the forward anode-cathode breakdown voltage of a controlled rectifier and $V_{piv}$ is the avalanche breakdown voltage of a diode, and rectifier means connected in series with said controlled rectifiers and with the same polarity.

5. Apparatus as described in claim 4 further comprising an inductor connected in series with said controlled rectifiers.

6. Apparatus as described in claim 5 further comprising means for simultaneously applying control pulses to the gate electrodes of all of said controlled rectifiers at selected intervals.

7. Apparatus as described in claim 4 further comprising a plurality of resistors, capacitors and diodes, means connecting one each of said resistors and capacitors in series circuits across individual ones of said controlled rectifiers, and means connecting one each of said diodes in parallel with indivdual ones of said resistors and with the same polarity as said controlled rectifiers.

8. Apparatus as described in claim 4 wherein said controlled rectifiers are divided into a plurality of groups of two rectifiers each and said avalanche diodes are connected in a staggered arrangement across said groups of rectifiers so that certain ones of said rectifiers are included within two successive rectifier groups.

9. Apparatus as described in claim 8 wherein said rectifier means is chosen to have a reverse breakdown voltage of a value that is at least equal to the combined reverse breakdown voltage of all of said controlled rectifiers connected in series therewith.

10. Apparatus as described in claim 8 wherein the number of controlled rectifiers is N and the number of avalanche diodes is N–1.

References Cited

UNITED STATES PATENTS

| | | | |
|---|---|---|---|
| 3,135,876 | 6/1964 | Embree et al. | |
| 3,238,520 | 3/1966 | Van Vlodrop. | |
| 3,281,677 | 10/1966 | Baggott. | |
| 3,386,027 | 5/1968 | Kilkore et al. | 321—11 |

LEE T. HIX, Primary Examiner

W. H. BEHA, Jr., Assistant Examiner

U.S. Cl. X.R.

307—252; 340—253